United States Patent Office 3,219,498
Patented Nov. 23, 1965

3,219,498
ORGANIC ACETYLENIC POLYMERS, THEIR PREPARATION AND USE AS EXPLOSIVES AND ROCKET PROPELLANTS
Siegfried Nitzsche and Robert Müller, Burghausen, Upper Bavaria, Germany, assignors, by mesne assignments, to Nitrochemie Gesellschaft mit beschrankter Haftung, Munich, Germany
No Drawing. Filed Feb. 24, 1961, Ser. No. 91,548
Claims priority, application Germany, Feb. 17, 1960, W 27,268
7 Claims. (Cl. 149—22)

The present application is a continuation-in-part of our co-pending application Serial No. 48,565, filed August 10, 1960, and entitled Organic Polymers and Methods of Preparation.

The present invention relates to a method for preparing organic polymers, to the compounds obtained thereby, to compositions of matter which are adapted for use as explosives and as rocket propellants, and also to a method for propelling rockets and carrying out explosions.

The preparation of organic polymers employing unsaturated hydrocarbon monomers is a known and ever-growing art. It is known that unsaturated aliphatic hydrocarbons can be added to a variety of hydrogen silicon compounds and polymers with the aid of certain metals and metal compounds as catalysts. It is the object of this invention to carry out a simultaneous polymerization of an unsaturated aliphatic hydrocarbon monomer and addition of an hydrogensilicon material thereto. A simple polymerization method with improved yield is also sought. Another object is a new series of derivatives of polymers. New polymers prepared by new methods are also an object. Other specific and general objects and advantages are detailed in or will be apparent from the following disclosure.

This invention comprises preparation of valuable high molecular weight organic polymers by reacting (1) a polymerizable organic compound containing at least one aliphatic multiple bond with (2) an organosilicon compound containing at least one hydrogen atom bonded to a silicon atom in each molecule, in the presence of (3) a compound of a metal selected from the group consisting of Ti, V, Cr, Zr, Cb, Mo, Hf, Ta and W, and (4) a metal selected from Mn, Os, Ir, Pt, Rh, Pd, and Au. The reaction can be carried out in an organic solvent if desired. The metallic ingredient (4) can be added as a compound which is reduced to the metal under the conditions of reaction.

This invention also includes the further reaction of (A) the polymeric products prepared from acetylene compounds by the above method with (B) an oxygen-containing acid, whereupon ester-like decomposition products are obtained which can readily be converted to water soluble materials.

The polymerizable unsaturated organic compounds employed herein are hydrocarbon alkenes and alkynes such as ethylene, propylene, pentene, octene, octadecylene, cetene ($C_{16}$), cerotene ($C_{28}$), melene ($C_{30}$), acetylene, butyne-1, heptyne-1, dodecyne-1, methylethylethylene, isobutylene, 3-methylbutyne-1, pentene-2, 2-methylbutene-2, pentyne-2, butadiene-1,3, allene ($CH_2$=CH=$CH_2$), pentadiene, isoprene, methylisoprene, vinylacetylene, divinylacetylene, diacetylene, dipropargyl (HC≡CCH$_2$CH$_2$C≡CH)

hexediyne-2,4, cyclopentene, cyclohexene, laurolene, cyclopentadiene, styrene, divinylbenzene, allylbenzene, phenylbutadiene, and phenylacetylene. Included in the operable organics are olefinic, acetylinic, di- and poly-olefinic, di- and poly-acetylinic, cycloolefins, and alkyl- and aryl-substituted or branched alkenes and alkynes. Non-hydrocarbon substituents can be present in the unsaturated organic compound. Thus halogen, oxygen (in the form of acids, anhydrides, alcohols, esters and ethers), nitrogen and metals such as Si, Ti, Zr, P, Ge, Sn and B can be present in the unsaturated molecule as in vinyl chloride, allyl bromide, allyl iodide, allylene bromide, tri- and tetrachloroethylene, tetrafluoroethylene, chloroprene, propargyl chloride, vinylidene chloride, dichlorostyrene, vinyl acetate, vinyl butyl ether, acrylic acid ester, acrylic acid nitrile, methacrylic acid ester, methacrylic acid nitrile, propiolic acid, allyl alcohol, methylvinylcarbinol, acrylic acid, methacrylic acid, vinylacetic acid, oleic acid, sorbic acid, linolenic acid, chaulmoogric acid, butenyl acetate, allyl stearate, diallyl succinate, diallyl glutarate, methylene malonic ester, diallyl phthalate and diallyl maleonate. Particularly useful are hydrocarbon olefins and hydrocarbon alkynes and their alkyl and aryl derivatives as well as functional derivatives thereof including esters, ethers, halides, nitriles and unsaturated acids.

The organosilicon compounds employed herein must contain in each molecule at least one hydrogen atom bonded directly to silicon. Monomeric, polymeric and copolymeric silicon compounds and mixtures thereof can be employed. Operable materials include inorganic hydrogen silanes such as $HSiCl_3$ and $H_2SiBr_2$ and organohydrogensilanes such as $RSiHCl_2$ and $R_2SiHCl$ wherein each R is a monovalent hydrocarbon, halohydrocarbon, hydrocarbonoxy, halohydrocarbonoxy, carboxy, amino or imino radical. Also operable are polymers including polysilanes, polysiloxanes, polysilcarbanes, polysilazanes or any polymers and copolymers of such polymeric units with other like or unlike units or with purely organic units. Suitable polymers include $Cl_2HSiSiHCl_2$, $R_2HSiSiBr_3$

$R_2HSiOSiR_2H$, $(RHSiO)_a$ where $a$ is at least 3, $R_3SiCH_2CH_2SiHCl_2$

$R_3SiC_6H_4SiH_2OR$, $R_3SiO(RHSiO)_bSiR_3$ where $b$ is a positive integer, and copolymers containing any one or more of unit $R_3SiO_{1/2}$, $R_2SiO$, $RSiO_{3/2}$ and $SiO_{4/2}$ along with at least one unit per molecule of the formulae $RHSiO$, $R_2HSiO_{1/2}$, $HSiO_{3/2}$, $H_2SiO$, and $RH_2SiO_{1/2}$.

In all of the preceding formulae each R can be any organic radical and each R can represent the same or different radicals in any particular molecule. In the preferred embodiments, each R represents a monovalent hydrocarbon or halohydrocarbon radical including alkyl radicals such as methyl, ethyl, butyl and octadecyl; cycloalkyl radicals such as cyclohexyl and cyclopentyl; aryl radicals such as phenyl, diphenyl and anthracyl; aralkyl radicals such as benzyl and phenylethyl; alkaryl radicals such as tolyl and ethylphenyl; haloaryl such as monochlorophenyl, dichlorophenyl, 3,3,3-trifluoropropyl, α,α,α-chlorotolyl, perchloroethyl, bromocyclohexyl, bromobenzyl, and so forth.

The preferred Si-H containing compounds are those having the general formula $R_xSiH_zY_{4-x-z}$ and hydrolysis products thereof, wherein R is as above defined, each Y is a halogen atom, alkoxy radical or —OOCR radical where R is as above defined, $x$ is 0, 1 or 2, and $z$ is 1 or 2. The hydrolysis products are of the unit formula

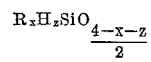

where R, $x$ and $z$ are as above defined but $x + z$ is less than 4. Commercial availability and cost factors favor the use of methylhydrogensiloxanes of unit formula $CH_3SiHO$.

The catalyst system includes (3) alkylates, acylates, enolates and halides of titanium, vanadium, chromium, zirconium, columbium, molybdenum, hafnium, tantalum, and tungsten. Preferred are the compounds of Ti, V and Zr because of availability and superior performance. Operative titanium and Zirconium enolates are disclosed in U.S. Patent No. 2,833,735, issued May 6, 1958. Operative zirconium compounds are further disclosed in Patent No. 2,789,956, issued April 23, 1957, and Patent No. 2,728,736, issued December 27, 1955. Further examples of operative Ti compounds are disclosed in U.S. Patents No. 2,721,855, issued October 25, 1955, No. 2,732,318, issued January 24, 1956, and No. 2,736,721, issued February 28 1956. Corresponding compounds of V, Cr, Cb, Mo, Hf, Ta and W are also operative.

Also included in the catalyst system is (4) a metal selected from transition elements including manganese, osmium, iridium, platinum, ruthenium, rhodium, palladium and gold. The metal is introduced in a finely divided or powdered form as in platinum block, platinized silica gel, platinized asbestos, platinized charcoal and similar forms of the manganese, osmium, iridium, ruthenium, rhodium, palladium and gold. Alternatively, the metal can be added as a compound which is reduced to the metal under the conditions of reaction such as $OsO_4$, $H_2OsCl_6$, $H_2IrCl_6$, $H_2PtCl_6$, $H_3RhCl_6$, $H_2PdCl_6$, $H_2MnCl_6$, $HAuCl_4$ and hydrates of such compounds. Only after the metal compound has been reduced does it exert the catalytic effect.

The proportions of (2) hydrogensilicon compound and (1) unsaturated organic compound employed herein depends only upon the silicon content desired in the ultimate product. An excess of either reactant can be employed and products containing unreacted $\equiv$SiH groups or unreacted olefinic or acetylenic linkages may be desired. However, it is preferred to use at least 2 mols of the catalyst (3) and $10^{-10}$ to $10^{-3}$ mols of the transition element as catalyst (4) for each equivalent of silicon bonded hydrogen to be reacted.

A wide variety of reaction conditions are operable herein. Reaction under vacuum, with heat, under pressure, in vapor phase or fluid bed and other variations are possible and are included within the scope of the invention. Because of the wide variety of reactants, the exact reaction conditions can be chosen to fit reactants, processing characteristics and desired product. A preferred embodiment comprises mixing (1) the unsaturated organic monomer or monomers, (2) organosiloxane containing silicon bonded hydrogen, and (3) the compound of Ti, V, Cr, Zr, Cl, Mo, Hf, Ta, or W in an inert solvent such as an aliphatic or aromatic hydrocarbon and/or ether which is fluid at the reaction temperature. The metal or metal compound of a transition element is added as catalyst (4) dissolved or dispersed in an organic ether, alcohol, or other suitable solvent. The reaction mass is heated in the range from room temperature up to 200° C. under normal or elevated pressure. The reaction occurs readily with excellent yields.

The polymeric products may contain unreacted $\equiv$SiH groups which can be removed by washing or digesting the polymer in slightly alkaline alcohol. The polymeric products are high polymers and include viscous fluids, gels, rubber-like gums, and moldable powders. The product depends upon the organic monomers employed as well as on the ratio of HSi to monomer in the reaction mass and to the degree of polymerization carried forward. All of the products contain silicon generally found at the chain ends of the telomeric products.

Products containing functional groups such as CN, COOH, COOR, OH, and so forth, can be further reacted with difunctional alcohols. Products containing unreacted double bonds which may be residual bonds or may result from reaction of an acetylenic linkage with SiH to produce the expected

unit, can be converted to other useful products by addition reactions. For example, the double bond can be employed for further modification by reaction with oxygen-containing acids with final saponification. Further, the double bond containing polymers can be halogenated, etc.

The subsequent reactions of the polymers prepared as noted above with oxygen containing acids is a further part of this invention. The polymerization products of acetylene are of commercial interest but have not attained wide commercial use. The polymerization method disclosed above is applicable to acetylenic monomers to produce polymers which contain silicon in the chemical structure.

Such polymers are further reacted with nitric acid to produce corresponding nitrates, with sulfuric acid to produce the corresponding sulfate, with acetic acid in the presence of zinc chloride to produce the acetate, and so forth. When oxidizing acids are employed, the Si=C bonds are cleaved thus esterifying the polymer and removing the pendent silicon groups simultaneously.

The oxygen-containing, esterlike polyene derivatives obtained as above can be converted to water soluble polyols via saponification, preferably in the presence of standard saponification catalyst such as dilute acids and alkalis, if desired under pressure. The water soluble alkali salts of the sulfated products display surface active properties and can be used as wetting agents. Such salts are obtained from the reaction products of polyene and sulfuric acid through further reaction with alkalis.

The unsaponified polyene esters are useful per se in adhesives, molding resins, preparation of artificial fibers, and a host of other uses. The nitrate derivatives find particular use as explosives.

The following examples are included herein to aid those skilled in the art in understanding and practicing this invention. The scope of the invention is defined in the appended claims and is not restricted by the examples. All parts and percentages in the examples are based on weight unless otherwise indicated.

*Example 1*

A mixture was prepared with 74 g. acrylic acid stabilized with methylene blue to prevent spontaneous polymerization, 60 g. methylhydrogensiloxane prepared by hydrolysis of methyldichlorosilane and stripping the hydrolyzate to 150° C. at atmospheric pressure (hereinafter MHS), 250 ml. tetrahydrofuran and $3\times10^{-5}$ mol chloroplatinic acid dissolved in ether. The mixture was heated to reflux and after 2 hours refluxing no reaction could be observed. 1.5 ml. tetra-n-butyltitanate was added and refluxing continued and immediately a reaction started. A viscous mass was obtained during 2 hours' refluxing. The reaction mass was separated from solvent by distilling off the solvent and 15 g. of unreacted acrylic acid was recovered. The reaction product was washed with benzene and then with weakly alkaline ethanol. The product obtained was a polymeric material and was tacky, stringy, soluble in hot water and in caustic soda. The unaltered product could be precipitated from caustic soda solution by acidification. The product dissolved and precipitated three times from caustic soda solution contained 8.3% of silicon.

*Example 2*

A mixture was prepared with 148 g. acrylic acid, stabilized as in Example 1, and 30 g. MHS dissolved in 200 ml. tetrahydrofuran and 200 ml. toluene mixed with 4 ml. tetra-n-butyltitanate and $3\times10^{-5}$ mol chloroplatinic acid and heated at reflux for 2 hours. The reaction product was processed in accordance with the procedure of Example 1. All of the acrylic acid had polymerized to form an elastic gumlike mass with a silicon content of 3.2%.

*Example 3*

A mixture of 52 g. acrylonitrile and 60 g. methylhydrogen siloxane cyclic tetramer [$(CH_3HSiO)_4$] was dissolved in 150 ml. benzene. The calalyst mix of $3 \times 10^{-5}$ mol of chloroplatinic acid and 0.5 ml. tetra-n-butyltitanate was added to the mixture and the mass refluxed for 20 minutes. The reaction mass was processed as in Example 1 to produce a 60% yield of pulverulent acrylonitrile polymer having an Si content of 1.4% based on the acrylonitrile.

*Example 4*

A mixture of 52 g. acrylonitrile and 60 g. MHS was dissolved in 150 ml. toluene. The catalyst mix of 4 ml. tetra-n-butyltitanate and $1 \times 10^{-5}$ mol chloroplatinic acid was added and the reaction mixture was refluxed for 30 minutes. The reaction mass was processed in accordance with the method of Example 1 and a quantitative yield of pulverulent polyacrylonitrile containing 2.5% silicon was obtained.

*Example 5*

A mixture of 100 g. phenylacetylene, 25 g. $(CH_3HSiO)_3$ and 4 g. tetra-n-butyltitanate was dissolved in 200 ml. benzene. The mixture was heated to reflux after the addition of $2 \times 10^{-5}$ mols of chloroplatinic acid. Reaction and polymerization were initiated at 80° C. and proceeded exothermically. After concentrating the solution by solvent evaporation, the mass was precipitated with ethanol. A viscous dark polymeric mass containing SiH groups (0.1% active hydrogen) was obtained. The polymer mass was treated with .01 N methanolic potash lye producing cross linking and evolution of hydrogen. The cross-linked polymer was not soluble in organic solvents and contained 7.5 percent silicon.

*Example 6*

A mixture of 15 g. MHS and 5 g. tetra-n-butyltitanate dissolved in 100 ml. benzene was heated at reflux under nitrogen until the solution was a deep blue. The catalyst system was completed by adding $1 \times 10^{-5}$ mol of chloroplatinic acid. The mixture was held at 60° C. and 54 g. of styrene was slowly added in drop-wise fashion. The polymer so produced was precipitated from a concentrated solution by adding ethanol. The polymer was redissolved in toluene and reprecipitated a total of 15 times. The polymer so obtained contained 0.1% silicon and further dissolving and precipitation did not alter this polymer. The polymer had a melting point of 170° C.

*Example 7*

The method of Example 6 was repeated employing 30 g. MHS, 5 g. tetra-n-butyltitanate, $1 \times 10^{-5}$ mol chloroplatinic acid and 54 g. styrene. A viscous oil with a silicon content of 9.4% was obtained. The oil contained ≡SiH groups and formed a gel when contacted with .01 N alcoholic potash lye which cleaved hydrogen off the silicon and produced cross-linking in the polymer.

*Example 8*

A mixture of 15 g. MHS and 2 g. $VO(OC_2H_5)_3$ in 200 ml. benzene was refluxed until it became light blue in color. A mixture of 54 g. styrene and 43 g. acrylic acid methyl ester was added at 60° C. Finally $3 \times 10^{-5}$ mol of $H(AuCl_4) \cdot 4H_2O$ was added to the mass and a stormy reaction occurred. The polymeric product was precipitated with alcohol and there was obtained an 80% yield of a pulverulent polymeric product containing 0.5% silicon calculated on the weight of monomers.

*Example 9*

A mixture of 15 g. MHS and 5 g. tetra-n-butyltitanate was dissolved in 200 ml. xylene and the solution changed to a 3 neck flask equipped with gas inlet tube and fused frit, stirrer and reflux condenser with gas outlet tube. The solution was heated to 140° C. with nitrogen bubbling through it and the solution turned dark blue. After addition of $1 \times 10^{-5}$ mol of chloroplatinic acid, an acetylene stream was bubbled into the solution at 4 bubbles per second for 2 hours. The product obtained was a black powder which was filtered from the reaction mass and cleaned by washing with xylene. The polymeric powder obtained contained 9.6% silicon.

*Example 10*

A mixture of 10 g. MHS and 3 g. tetra-n-butyltitanate was dissolved in 250 ml. ligroin (B.P. 150°–180° C.). The solution was placed in a 1 liter steel autoclave and heated to 120° C. under nitrogen until the solution was deep blue. A solution of 7 mg. chloroplatinic acid in 0.5 ml. ether was added via pipette. The nitrogen was driven out of the autoclave by introducing purified acetylene. Further acetylene was added to a pressure of 10 atmospheres at 115° C. and further acetylene was added to maintain that pressure at 115° C. during the reaction. An immediate reaction was noted. After 6 hours the autoclave was cooled and vented and the reaction mass filtered. The polymeric product was washed with alcohol and acetone and dried. A fine black powder was obtained in good yield. The polymeric powder was excellent as a filler for rubber.

*Example 11*

Equivalent results were achieved when Example 1 was repeated substituting chemically equivalent amounts of the following materials for the acrylic acid: ethylene, pentene, pentene-2, butyne-1, methylethylethylene, allene, methylisoprene, dipropargyl, cyclopentene, vinylchloride, tetrafluoroethylene, vinylacetate, vinylacetic acid, methylvinylcarbinol and diallylphthalate.

*Example 12*

Equivalent results were achieved when Example 2 was repeated substituting equivalent amounts of the following materials for the methylhydrogensiloxane: methylhydrogendichlorosilane, dihydrogenotestramethyldisiloxane, trimethylsilyl endblocked methylhydrogensiloxanepolymers of 50–1000 cs. at 25° C., copolymers of 10 mol percent methyl hydogensiloxane and 90 mol percent of units chosen from methylsiloxane units $(CH_3SiO_3/2)$, dimethylsiloxane units and trimethylsiloxane units.

*Example 13*

Equivalent results were achieved when Example 3 was repeated substituting the following metal compounds for the tetra-n-butyltitanate: tetrapropyltitanate, tertiary-butyltrimethylzirconate, octyleneglycolzirconate, tetra-2-ethylhexylzirconate, titanium chloride, titanium acetate, and the corresponding compounds of vanadium, chromium, columbium, molbdenum, hafnium, tantalum and tungsten.

*Example 14*

Equivalent results were achieved when Example 4 was repeated substituting the following metals and metal compounds for the chloroplatinic acid; powdered manganese, osmium, iridium, platinum, rhodium, palladium and gold and $H_2OsCl_6$, $H_2IrCl_6$, $H_3RhCl_6$, $H_2PdCl_6$, $H_2MnCl_6$ and hydrates of such compounds.

*Example 15*

The black polymeric powder prepared in Example 9 was heated to 90° C. with concentrated sulfuric and in the presence of catalytic traces of mercuric oxide. The polymeric powder dissolved to produce a deep red solution and silica was separated. The solution was filtered and the filtrate was neutralized with soda lye. The sodium salt of the sulfonated polymer was precipitated with sodium chloride. The sodium salt so prepared is soluble in water and displays excellent surface activity.

*Example 16*

The black pulverulent polyene prepared in Example 9 was treated with a mixture of acetic acid and acetic acid anhydride in the presence of dry zinc chloride and at 100° C. A pale yellow product containing residual silicon was formed. The acetylated polymer was saponified with dilute mineral acids to produce water soluble products identified as silicon containing polyols.

*Example 17*

The black pulverulent polyene of Example 9 was heated with 10% aqueous persulfuric acid solution. A water soluble, white, silicon containing polymer was obtained by saponifying with dilute mineral acids.

*Example 18*

The black powdered polyene of Example 9 was heated slightly with concentrated nitric acid. Silica was recovered and a yellow powder was obtained. The yellow powder was soluble in acetone and decomposed explosively under thermal or mechanical agitation.

*Example 19*

The black powdered polyene of Example 9 was treated at low temperature with chlorine water. A pure white mass was formed which contained silicon and chlorine and was soluble in chloroform.

Thus, according to the present invention, high-molecular, silicon-containing poly-ynes or polymerized members of the acetylene series, particularly poly-acetylenes, are produced by reaction with an organosilicon compound containing in each molecule at least one hydrogen atom bonded directly to silicon. Organosilicon compounds of this kind are sometimes referred to as H-siloxanes. The reaction is carried out in the presence of compounds of elements from the IV to VI subgroups of the periodic system and of reducible compounds of the transition metals or the corresponding metals with acetylene or its homologues or derivatives.

For instance, as described in Example 9 above, acetylene may be polymerized to form a black powder by reaction with methylhydrogenpolysiloxane in the presence of tetra-n-butyltitanate and chloro-platinic acid. By carrying out the polymerization under pressure, a finally subdivided powder containing only about 0.3% silicon is obtained.

Poly-ynes which were preferably obtained as described above can then be reacted under pressure with oxygen-containing, oxidizing acids such as peracids and nitric acid. In this manner, firm and stable solid compounds are obtained.

The nitration of the poly-acetylene is easily accomplished with concentrated nitric acid and, in this manner, a yellowish, finely subdivided powder is obtained which can be safely handled.

Surprisingly, it has been found according to the present invention that the poly-ynes, particularly the poly-acetylenes as well as their oxidation and nitration products, are excellently suitable as rocket propellants and partially also as general purpose explosives.

Synthetic high molecular substances are known to be very suitable for the manufacture of plastic materials and molding compositions. These advantageous properties which are due to the high molecular structure of these substances are also present in the products obtained by nitrating synthetic high molecular compounds, and these products further have, up to a certain degree, the character of explosives. As such, however, they do not have any particular practical importance, because they are in no way superior to the known explosives and in many cases do not even fulfill the requirements which are normally put on such explosives.

The above mentioned suitability of certain unnitrated and nitrated synthetic high molecular substances, i.e. their suitability for plastics as well as explosives, can be advantageously used for one single purpose if the drawbacks resulting from the lacking or too low content of oxygen are removed. Thus, the present invention relates to a novel class of explosives and propellants which are mixtures of unnitrated and/or nitrated synthetic high molecular substances with inorganic and/or organic oxygen carriers and, if desired, also carbon carriers. The preparation of these mixtures and, if desired, their shaping by heat-molding or by melting and casting takes place according to the methods usually employed in the field of plastics and explosives.

It is further known to vary the properties of the so-called double base propellants by means of suitable additives. However, the results obtained up to now have not been satisfactory, for the increasing demands of modern weapon industry continuously require a further development of such propellants.

It is further known to mix explosives or oxygen carriers and, if desired, carbon carriers with thermoplastic or curable plastic materials and to make molded articles from these mixtures, which articles may serve as explosives or propellants. The thus solidified explosives are meeting with an increasing interest, for the requirements put on the mechanical and thermal strength of explosives and propellants are continuously increasing. One disadvantage, however, is that many synthetic resins and plastics require a large amount of oxygen and can therefore be admixed only in relatively small amounts. Thus, plastics or binders having a large content of oxygen and energy are very desirable as components for shaped explosives and propellants.

It has now unexpectedly been found that poly-acetylenes rich in energy which do not contain any deleterious metallic residues from their preparation, and oxidation or nitration products, respectively, of such poly-acetylenes quite generally are excellently suitable as components of the basic compositions for explosives, propellants and solid rocket compositions.

Although the poly-acetylenes which can be used according to the invention can be obtained preferably according to the above described methods of operation, poly-acetylenes prepared by polymerization of acetylene according to Ziegler or according to modified Ziegler methods with the aid of catalyst mixtures consisting especially of aluminum compounds on the one hand and of titanium compounds on the other hand, e.g., according to British Patent No. 826,674, are likewise suitable for the purposes of this invention. These compounds, too, do not contain any metallic residues that would be deleterious to the final products.

The properties of the poly-acetylenes prepared according to the above described methods render said poly-acetylenes extraordinarily suitable for using them as components in explosives and propellants. The oxygen content of their oxygen derivatives or nitrate derivatives, respectively, is such that these have themselves explosive properties. Upon stronger heating they explode. Since the decomposition point of these poly-acetylenes lies at about 180° C., they can well be worked under heating. When preparing poly-acetylenes they are obtained in the form of powders and therefore can easily be mixed with the other components. These mixtures which according to the invention should contain at least about 0.5% of poly-acetylene can be molded into shaped bodies; the molding temperature naturally must depend on the thermal stability of the mixtures. Depending upon the composition of the mixtures, the products can also be cast, extruded or otherwise shaped.

It has already been suggested to use polymerization products of acetylene, known, e.g., under the names Cupren and Carben, for explosive mixtures; these suggestions, however, have never been put into practice on an industrial scale, and this for the following reasons:

Firstly, Cupren or similar conversion products of acetylene are not suitable for the manufacture of rocket compositions and powders, because their copper content amounting to about 1.7 to 3% has a deleterious effect upon the stability of the final powder; it is especially the thermal stability that is impaired by it. Besides, the copper would have a catalytic effect on the decomposition of nitroglycerine.

The polyacetylenes according to the invention, however, differ from the known products not only by the absence of copper but also by their physical properties. For the purpose desired herein it is above all the energy content which is of essential importance. In the known products containing copper this energy content has ranged from 6 to not more than 10,000, mostly from about 6,000 to 7,000 cal./g., whereas the products to be used according to this invention contain up to 12,000 cal./g., mostly within a range of about 10,000 to 12,000 cal./g.

These latter novel products correspond to the formula $(CH)_x$, whereas products such as Cupren, etc., have a lower content of hydrogen.

It has further been suggested to use mixtures of nitration products of copper-containing poly-acetylenes, such as Cupren or Carben, with nitric acid as explosives; if desired, liquid air or other explosives, carbon carriers, oxygen carriers, respectively, can be added. These suggestions, too, however, could not be put into practice which is due to the instability of said products.

With the poly-acetylenes of this invention the most different explosives and oxygen carriers can be combined. They can be mixed with pentaerythrite tetranitrate, with cyclotrimethylene trinitramine (hexogen), trinitro toluene, tetranitro methylaniline (tetryl), diethanol nitramine dinitrate (DINA) and similar nitrates and nitro compounds, furthermore with oxygen carriers such as ammonium nitrate, alkali nitrates, alkaline earth nitrates, ammonium perchlorate, alkali perchlorates, alkaline earth perchlorates and chlorates, respectively, and similar salts. The above mentioned materials can be processed individually or several of them can be processed simultaneously with polyacetylene. Certain quantities of explosive oils such as nitroglycerine or nitroglycol can be added to such mixtures and improve their plastic properties. Of course it is also possible to combine poly-acetylene only with oxygen carriers which is especially the case if propellants are to be obtained. With such mixtures care must be taken to insure a proper particle size of the components, as the burning rate of the final molded bodies largely depends thereon.

Apart from oxygen carriers materials of high combustion heat, for example metal powders, such as aluminum, magnesium, zinc, and also carbon, boron, silicon, hydrogen, boride and the like can also be added to increase the energy yield.

An improvement of the binding properties and the plastic behavior can be obtained by adding small amounts of other high polymers and plasticizers, for example polyethylene, polyvinyl alcohol, polyvinyl esters, polyvinyl chloride, polyacrylates and -methacrylates, nitrocellulose, nitro starch, phthalic ester, dinitro toluene or the like.

For the preparation of the molded bodies the polyacetylene is mixed with the desired quantities of the additives, preferably in mechanical mixers or by whirling, and the homogenous mixtures are molded into suitable shapes, generally employing temperatures up to about 120° C. and above.

The following examples are illustrative of the preparation of molded bodies from poly-acetylene and additives.

*Example A*

70% of finely powdered ammonium nitrate (granulation below 0.1 mm. screen passage) and 25% of poly-acetylene and 5% of nitroglycerine are mixed and molded. A good explosive is obtained.

*Example B*

50% of ammonium perchlorate, 8% of aluminum powder (so-called "pyro cut"), 25% of nitro poly-acetylene and 15% of polyvinyl chloride are block-molded adding 2% of sensitizer (such as ammonium chromate or Prussian blue or a mixture of both). The mixture renders a very good rocket composition.

*Example C*

By mixing of 10% of trinitro toluene, 10% of a mixture of dinitro toluene (B.P. 0° C.) and trinitro toluene (in a proportion of 1:1), 3% of nitrocellulose (containing 12.2% N) for thickening, 2% of poly-acetylene and 75% of ammonium nitrate (granulation below 0.1 mm. screen passage) one obtains an excellent propellant.

Apart from their use for explosives and rocket compositions the above poly-acetylenes rich in energy and their nitration products surprisingly are also excellently suitable as components in basic compositions for conventional propellant powder. As has unexpectedly been found, above all the burning rate of such powders can be highly increased thereby. Amounts even as small as about 0.5% result in an increase of the burning rate of the powder up to 20%; larger amounts give an increase of the burning rate up to 100%. The amounts of poly-acetylene added range from 0.1 to 20%, preferably from 0.5 to 3% and especially from 1.0 to 2.3%. Larger amounts of poly-acetylene or its nitration products do not result in a further improvement of the effect. The major component of such conventional propellant powders is formed by organic nitrates or nitro bodies, respectively. Further components are plasticizers and stabilizers. For further processing the masses and adding the additives several methods are practiced which comprise either dissolving individual components in solvents or solvent mixtures or the blending and gelation is effected with the aid of rolls, extruders or other devices normally used for this purpose.

As an example, the following is a description of the preparation of a powder for which no solvent is used (so-called solventless powder).

The preparation of such powders, i.e., the gelation of the raw masses of these powders without solvent (double base propellant) is effected by treating them between two rolls that may be heated, said rolls being disposed in parallel arrangement and the space width between them being adjustable, e.g., within a range of from 0.50 to 5.0 mm. The powderous raw mass having a water content of about 30% is first passed numerous times through the space between the rolls in order to remove the major portion of the water, and subsequently gelatinized by dissolving the nitrocellulose under the action of pressure and heat in the explosive oil contained in the powderous raw mass. The gelation must be preceded by a dehydration of the raw mass. Instead of squeezing it off on the rolling mill the water can also be removed by other means, e.g., by employing extruders.

*Example D*

A powder prepared according to the above described method and having an energy content of about 850–890 cal./g. has a burning rate of about 1.06 cm./sec.

Composition of that powder:

| | Percent by weight |
|---|---|
| Powderous raw mass consisting of 66.5% nitrocellulose and 33.5% nitroglycerine | 89 |
| Diethyldiphenyl urea | 1.5 |
| Ethylphenyl urethane | 4.25 |
| Diphenyl urethane | 2.0 |
| Potassium cryolite | 2.0 |
| Lead stearate | 1.0 |
| Magnesium oxide | 0.25 |
| | 100.00 |

Adding 2% of poly-acetylene to the above mass results in a powder having a burning rate of about 1.58 cm./sec.

*Example E*

A raw mass containing nitroglycerine is thoroughly mixed with the solid additives (MgO, graphite, poly-acetylene and stabilizer) and then the triacetine is sprayed upon. This mixture is further homogenized at 80° C.

milling it at 60–80° C., then dehydrated and completely gelatinized. Finally rolled sheets are obtained which are subsequently molded by means of an extruder. After 15 hours of a riping process the rocket composition is ready. It is composed, e.g., as follows:

| | Parts by weight |
|---|---|
| Raw mass containing 40–60% nitroglycerine | 82–90 |
| Triacetine (glycerine triacetate) | 3–10 |
| Diethyldiphenyl urea (or other stabilizer) | 1.5–2.5 |
| Poly-acetylene | 0.1–5 |
| Candelilla wax (candelina, kanutilla wax) | 0.2–0.5 |
| MgO | 0.03–0.07 |
| Graphite | 0.03–0.07 |
| Lead stearate | 0.1–0.4 |

Without further analysis, the foregoing will so fully reveal the gist of the present invention that others can by applying current knowledge radily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A rocket propellant, which comprises a crystalline, subdivided polymer acetylene compound formed by reacting (1) acetylene, and (2) an organosilicon compound containing at least one hydrogen atom bonded directly to silicon in each molecule in the presence of (3) a compound of a metal selected from the group consisting of Ti, V, Cr, Zr, Nb, Mo, Hf, Ta and W, and (4) a metal selected from the group consisting of Mn, Os, Ir, Pt, Rh, Pd and Au, said polymer acetylene compound being free of copper and having an energy content of at least 10,000 calories per gram, an explosive and an oxygen carrier.

2. A rocket propellant, which comprises a crystalline, subdivided polymer acetylene compound formed by reacting (1) acetylene, and (2) an organosilicon compound containing at least one hydrogen atom bonded directly to silicon in each molecule in the presence of (3) a compound of a metal selected from the group consisting of Ti, V, Cr, Zr, Nb, Mo, Hf, Ta and W, and (4) a metal selected from the group consisting of Mn, Os, Ir, Pt, Rh, Pd and Au, said polymer acetylene compound being free of copper and having an energy content of at least 10,000 calories per gram, and at least one explosive selected from the group consisting of pentaerythritol tetranitrate, cyclotrimethylene trinitramine, trinitrotoluene, tetranitromethyl aniline, diethanol nitramine dinitrate, nitroglycerine and nitroglycol.

3. A rocket propellant, which comprises a crystalline, subdivided polymer acetylene compound formed by reacting (1) acetylene, and (2) an organosilicon compound containing at least one hydrogen atom bonded directly to silicon in each molecule in the presence of (3) a compound of a metal selected from the group consisting of Ti, V, Cr, Zr, Nb, Mo, Hf, Ta and W, and (4) a metal selected from the group consisting of Mn, Os, Ir, Pt, Rh, Pd and Au, said polymer acetylene compound being free of copper and having an energy content of at least 10,000 calories per gram, and at least one oxygen carrier selected from the group consisting of ammonium nitrate, alkali metal nitrates, alkaline earth nitrates, ammonium perchlorate, alkali metal perchlorates, alkaline earth perchlorates, ammonium chlorate, alkali metal chlorates and alkaline earth chlorates.

4. A rocket propellant, which comprises a crystalline, subdivided polymer acetylene compound formed by reacting (1) acetylene, and (2) an organosilicon compound containing at least one hydrogen atom bonded directly to silicon in each molecule in the presence of (3) a compound of a metal selected from the group consisting of Ti, V, Cr, Zr, Nb, Mo, Hf, Ta and W, and (4) a metal selected from the group consisting of Mn, Os, Ir, Pt, Rh, Pd and Au, said polymer acetylene compound being free of copper and having an energy content of at least 10,000 calories per gram, at least one explosive, and at least one oxygen carrier selected from the group consisting of ammonium nitrate, alkali metal nitrates, alkaline earth nitrates, ammonium perchlorate, alkali metal perchlorates, alkaline earth perchlorates, ammonium chlorate, alkali metal chlorates and alkaline earth chlorates.

5. A rocket propellant, which comprises a crystalline, subdivided polymer acetylene compound formed by reacting (1) acetylene, and (2) an organosilicon compound containing at least one hydrogen atom bonded directly to silicon in each molecule in the presence of (3) a compound of a metal selected from the group consisting of Ti, V, Cr, Zr, Nb, Mo, Hf, Ta and W, and (4) a metal selected from the group consisting of Mn, Os, Ir, Pt, Rh, Pd and Au, said polymer acetylene compound being free of copper and having an energy content of at least 10,000 calories per gram, at least one explosive selected from the group consisting of pentaerythritol, tetranitrate, cyclotrimethylene trinitramine, trinitrotoluene, tetranitromethyl aniline, diethanol nitramine dinitrate, nitroglycerine and nitroglycol, and at least one oxygen carrier selected from the group consisting of ammonium nitrate, alkali metal nitrates, alkaline earth nitrates, ammonium perchlorate, alkali metal perchlorates, alkaline earth perchlorates, ammonium chlorate, alkali metal chlorates and alkaline earth chlorates.

6. A rocket propellant, which comprises a crystalline, subdivided polymer acetylene compound formed by reacting (1) acetylene, and (2) an organosilicon compound containing at least one hydrogen atom bonded directly to silicon in each molecule in the presence of (3) a compound of a metal selected from the group consisting of Ti, V, Cr, Zr, Nb, Mo, Hf, Ta and W, and (4) a metal selected from the group consisting of Mn, Os, Ir, Pt, Rh, Pd and Au, said polymer acetylene compound free of copper and having an energy content of at least 10,000 calories per gram, and at least an energy yield increaser selected from the group consisting of aluminum, magnesium, zinc, carbon, boron, silicon and hydrogen boride.

7. A rocket propellant, which comprises a crystalline, subdivided polymer acetylene compound formed by reacting (1) acetylene, and (2) an organosilicon compound containing at least one hydrogen atom bonded directly to silicon in each molecule in the presence of (3) a compound of a metal selected from the group consisting of Ti, V, Cr, Zr, Nb, Mo, Hf, Ta and W, and (4) a metal selected from the group consisting of Mn, Os, Ir, Pt, Rh, Pd and Au, said polymer acetylene compound free of copper and having an energy content of at least 10,000 calories per gram, and a plastic binder selected from the group consisting of polyethylene, polyvinyl alcohol, polyvinyl esters, polyvinyl chloride, polyacrylates and methacrylates, nitrocellulose, nitre starch, phthalic ester and dinitro toluene.

References Cited by the Examiner

UNITED STATES PATENTS

| 2,637,718 | 5/1953 | Rust | 260—46.5 |
| 2,645,629 | 7/1953 | Nitzsche | 260—46.5 |
| 2,811,431 | 10/1957 | Zwicky et al. | 149—1 |
| 2,919,541 | 1/1960 | Mahan | 60—35.4 |
| 2,929,199 | 3/1960 | Short et al. | 60—35.4 |
| 3,030,289 | 4/1962 | Good et al. | 60—35.4 X |
| 3,086,895 | 4/1963 | Schaeffer et al. | 149—19 |

OTHER REFERENCES

Chem. and Eng. News, Sept. 28, 1959, pp. 41 and 42.

CARL D. QUARFORTH, *Primary Examiner.*

LEON D. ROSDOL, *Examiner.*